(No Model.)
G. A. KENNEDY.
SAW FILING DEVICE.
No. 508,722. Patented Nov. 14, 1893.
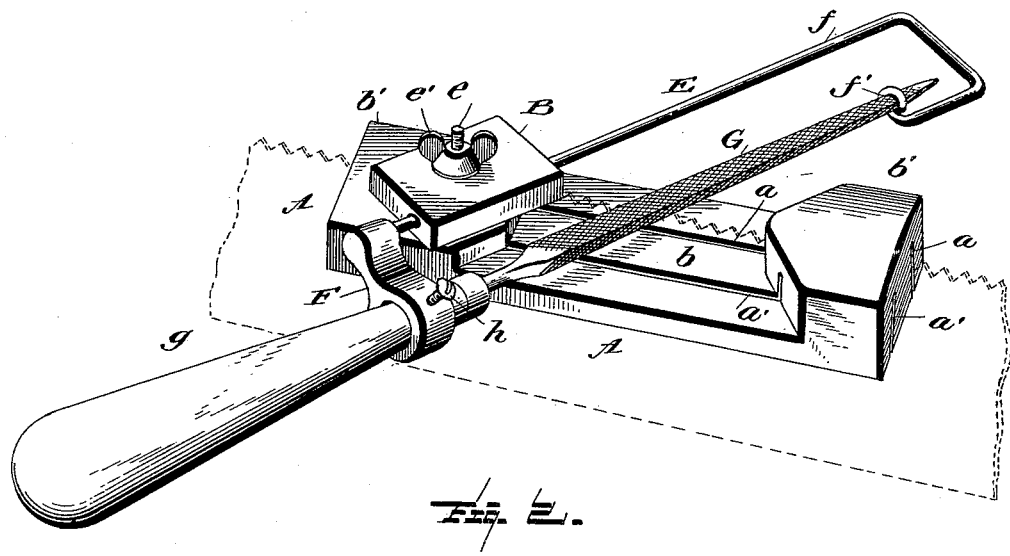
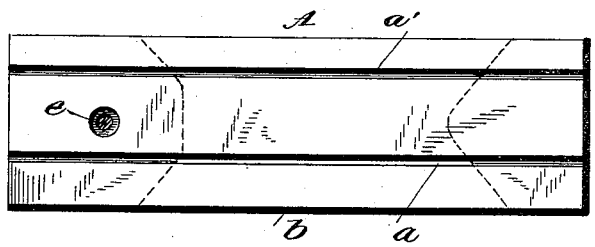
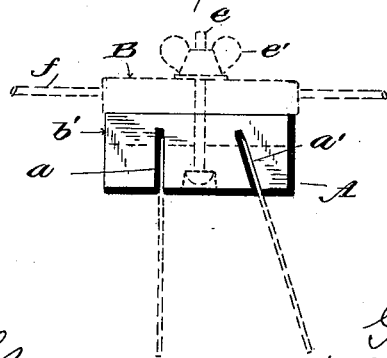
Witnesses:
L. C. Hills.
E. S. Trull.
Inventor
George A. Kennedy,
by Franklin H. Hough
his Attorney

UNITED STATES PATENT OFFICE.

GEORGE A. KENNEDY, OF OLENA, OHIO.

SAW-FILING DEVICE.

SPECIFICATION forming part of Letters Patent No. 508,722, dated November 14, 1893.

Application filed May 5, 1893. Serial No. 473,109. (No model.)

*To all whom it may concern:*

Be it known that I, GEORGE A. KENNEDY, a citizen of the United States, residing at Olena, in the county of Huron and State of Ohio, have invented certain new and useful Improvements in Saw-Filers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to devices to facilitate the filing and gaging of saws and insure a uniform edge to all the teeth, whether straight across as for rip saws, or, at an angle as for cross cut saws.

The improvement consists, essentially, of a block having one or more longitudinal kerfs in its lower face to receive the lower edge of the saw to relatively fix and steady the said block on the saw, a guide block connected by a bolt with one end of the main block and adapted to turn on the bolt to admit of the proper adjustment of the file, and a file frame mounted in the said guide block and guided in its movements thereby.

The improvement further consists of the novel features which hereinafter will be more fully described and claimed, and which are shown in the annexed diagrams, in which—

Figure 1, is a perspective view showing the application of the invention. Fig. 2, is a bottom plan view of the main block showing the longitudinal kerfs. Fig. 3, is an end view of the main block.

The main block A is oblong to enable it to obtain a broad bearing upon the saw and its ends $b'$ are made thicker than the middle portions $b$ to straddle the saw. This block may be made of suitable material, metal, composition, or wood, the latter being preferable owing to lightness and cheapness of construction. A series of longitudinal kerfs $a\ a$, is provided in the under or lower side of the block of sufficient depth to admit of the block obtaining a firm purchase upon the saw so as not to have any appreciable rocking movement and permit of the teeth projecting a proper distance above the top side of the intermediate portion $b$ between the thickened or raised end portions $b'$. These kerfs will extend longitudinally in parallel relation and occupy different relative angles to the lower side of the block, so that the required pitch of the file to the plane of the saw may be had. The kerf $a$ is at right angles to the lower face of the block and when the saw is received therein, the file is at right angles to the plane of the said saw. The kerf $a'$ inclines and when fitted on the saw gives a corresponding inclination to the file, so that the teeth receive an upward bevel when filed.

A guide block B is placed upon one of the raised ends $b'$ and is held thereto by bolt $e$ and has an opening to receive the guide rod of the file frame E and guide the latter in its movements. This guide block can turn on the bolt $e$ to give the proper angle to the teeth and is fixed in the required position by turning up the thumb nut $e'$ on the bolt.

The file frame is composed of a stout wire $f$ having a bent end which terminates in an eye $f'$ to receive the end of the file G, and a cast metal arm F attached at one end to the wire $f$, and having an opening at the opposite end to receive the file handle $g$, the latter being held in place by a binding screw $h$.

To use the device the block A is set upon the edge of the saw I, the latter entering the desired kerf, and, the guide block B having been properly adjusted, the filing is effected in the usual manner by moving the frame E through the guide block. The device is moved on the saw step by step after filing each tooth as will be readily understood.

I claim—

1. A saw filing machine composed of a block having a series of longitudinal kerfs extending in parallel relation and at different angles from the lower side of the said block a guide block, and a file frame adapted to reciprocate in the said guide block, substantially as set forth.

2. A saw filing machine, composed of a block having raised ends, and having a series of kerfs in its lower face extending in parallel relation and at different angles to the lower face of the block, the kerfs projecting through that portion of the block between the raised ends, a guide block adjustable on one of the raised ends, and a file frame adapted to reciprocate through the said guide block, substantially as described.

In testimony whereof I affix my signature in presence of two witnesses.

GEORGE A. KENNEDY.

Witnesses:
HENRY W. BUTLER,
G. V. KNIGHT.